United States Patent [19]

Kikinis

[11] Patent Number: 5,416,610
[45] Date of Patent: * May 16, 1995

[54] INTEGRAL COMPUTER SCANNING SYSTEM

[75] Inventor: Dan Kikinis, Saratoga, Calif.

[73] Assignee: Cordata, Inc., Tortola, Virgin Islands (Br.)

[ * ] Notice: The portion of the term of this patent subsequent to Jul. 19, 2011 has been disclaimed.

[21] Appl. No.: 221,847

[22] Filed: Apr. 1, 1994

Related U.S. Application Data

[63] Continuation of Ser. No. 967,408, Oct. 27, 1992, Pat. No. 5,331,434.

[51] Int. Cl.⁶ .............................................. H04N 1/04
[52] U.S. Cl. ................................... 358/474; 358/400; 358/471; 364/709.1; 345/207
[58] Field of Search .................. 348/834, 835, 836; 358/500, 400, 474, 471, 475, 485; 364/709.1; 345/207; 382/58

[56] References Cited

U.S. PATENT DOCUMENTS 5,155,627 10/1992 Keehn et al. .................... 348/834

Primary Examiner—Edward L. Coles, Sr.
Assistant Examiner—Fan Lee
Attorney, Agent, or Firm—Donald R. Boys

[57] ABSTRACT

A photovoltaic film provided with a computer allows the computer to be used as a scanner as well as a conventional computer. In a preferred embodiment the photovoltaic film is transparent, and is applied directly to the display screen of the computer system. The film is connected to signal processing means connected to the internal bus structure of the computer. A hard copy document is positioned adjacent the film, and control routines loaded to and run on the computer control pixel illumination on the computer screen in a scanning protocol. Illumination of pixels in conjunction with characteristics of the hard copy at the pixel position cause the signal generated by the photovoltaic film to alter in voltage. Signals from the film are processed and used to generate a bit pattern as the scanned image. In an alternative embodiment the photovoltaic film is a part of a separate sheet applicable to a computer screen and connectable to an expansion card for connection to the computer, providing a system useful with existing computers.

17 Claims, 5 Drawing Sheets

INTEGRAL COMPUTER SCANNING SYSTEM

CROSS REFERENCE TO RELATED DOCUMENTS

This application is a continuation of application Ser. No. 07/967,408, filed Oct. 27, 1992, now U.S. Pat. No. 5,331,434.

FIELD OF THE INVENTION

The present invention is in the field of devices for scanning hard copy documents to produce electronic bit-mapped records which may be edited and enhanced by computer systems.

BACKGROUND OF THE INVENTION

Scanner technology is one of the most significant developments of the past few years in the field of image processing. Scanners allow an image to be entered in digitized form into a computer's data bank, where it can later be edited and manipulated as a bit-mapped graphic image.

For the purpose of this specification the term "hard copy" is meant to convey any sheet of paper or other material with text or graphic information thereon. This is the original from which one might wish to produce an electronic copy by a scanning operation.

The most, common scanners in use today are flatbed and roller-fed scanners. In the first, a page to be scanned is laid on top of a glass cover and is in turn covered by another heavy opaque sheet to keep out light. In the second type, the roller-fed scanner, a sheet is inserted between rollers. This type is typically limited to single sheet scanning. FIG. 5 shows a prior art, flatbed scanner 1 which accepts a hard copy 3 laid on platen 5 and electronically takes a picture of it, digitizes that picture, and enters it into the data bank of a connected computer (not shown). The scanner connects to the computer by means of cable 7 to the computer's serial port.

One or the difficulties of working with a flatbed or roller-fed scanner is that these devices are generally large and bulky and not easily ported from one location to another. They are relatively expensive and are composed of many fragile parts, such as a sensitive lens that needs to be handled gently to preserve alignment.

FIG. 6 shows a hand-held scanner 9, another type of scanner in popular use. This is a small hand-held device that is moved slowly across part of a scene or image, starting each pass across the page at a lower point than the last pass, making certain that the bottom of the last scan pass appears at the top of the present pass (or the reverse if a scan is begun at the bottom of an image). Several passes are typically required to input a full page, and there must be a means to deal with the overlap necessary to obtain a full image. Problems with hand-held scanners include bypassing areas due to untimely or incorrect movement and maintaining the proper dimensions of an image. Hand-held scanners, being small, have the additional problem of being easily misplaced under desktop clutter, and are also easily dropped and damaged.

Scanners, as charge-coupled devices, typically have little or no on-board memory, which adds to the expense of operation since all memory requirements must be met by the host computer. The connected computer must also manage the scanner's operation, and must therefore be compatible with that particular brand of scanner. The complexity of connecting a scanner to a computer can present problems, and alternative methods of entering an image into a computer data bank can include time-consuming drawing or re-typing, or the expense of digitizing equipment.

What is clearly needed is an apparatus and method in which scanning can take place simply, requiring no more than a computer, such as a notebook or lap-top unit, electronic circuitry included in that computer for scanning an image, and a means of utilizing the computer's display in the scanning operations, effectively making the computer also a scanner.

SUMMARY OF THE INVENTION

In a preferred embodiment of the present invention a computer display screen system is provided having a display with a surface for illuminating pixel elements in a pattern determined by a host computer. A photosensitive film overlies a portion of the surface for intercepting light emitted from the display surface as pixels are illuminated. The screen also has means for positioning a hard copy document parallel to and adjacent the photosensitive film, and means for conducting signals produced in the photosensitive layer in response to incident light away from that layer.

In one embodiment the photosensitive layer is a permanent part of the screen, and in an alternative embodiment a removable sheet is provided to be applied to an existing display screen. In either embodiment the display can be operated to illuminate individual pixels, and signals generated in the photosensitive layer as a result of incident light from the pixels illuminated are conducted to the computer and used to create a bit-map of the hard copy document.

The invention is useful combined with virtually any active display, and a method for scanning using the apparatus of the invention is also provided.

The invention allows a user to use a computer also as a scanner, and is particularly useful with portable computers, such as laptop and notebook types, with the advantage of easy portability.

DESCRIPTION OF THE PREFERRED EMBODIMENTS

Figure 1:
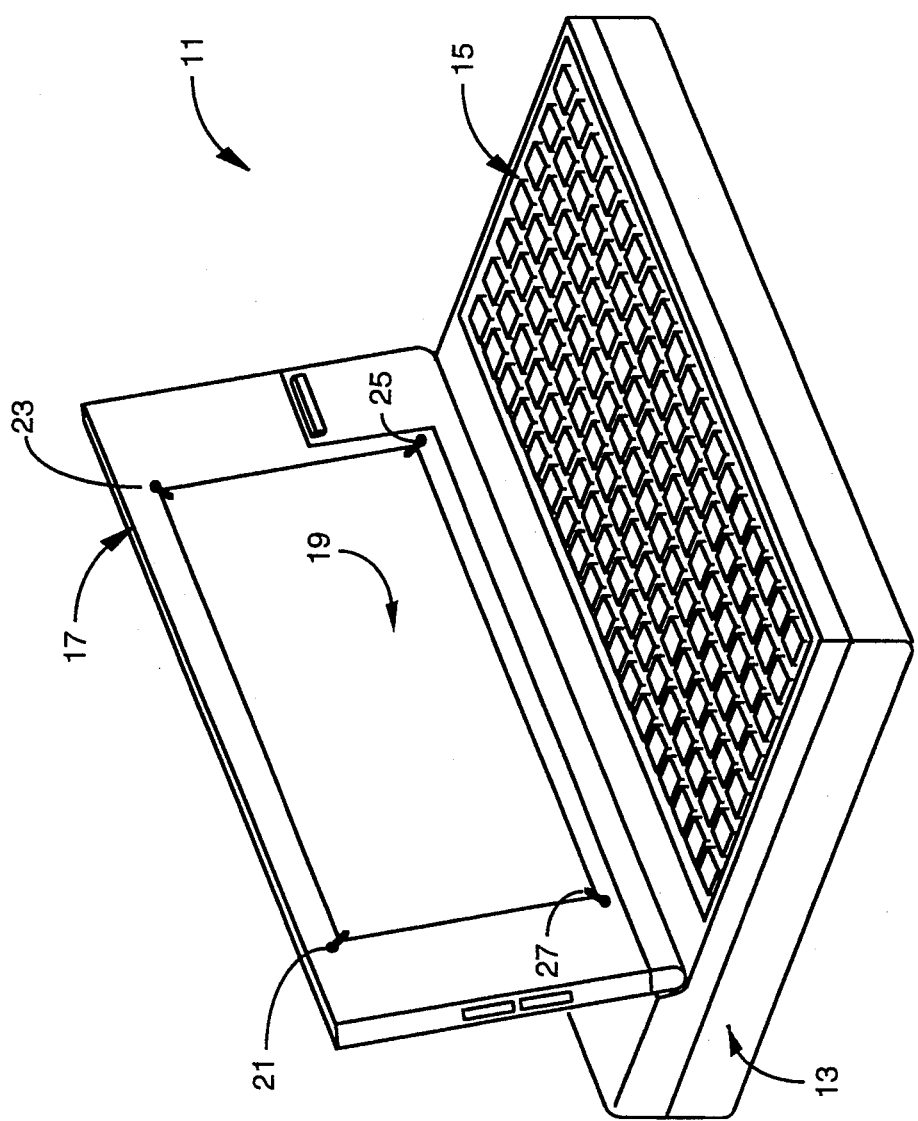
FIG. 1 is an isometric view of a notebook computer with an integral scanner according to the invention.

FIG. 1 shows a notebook computer 11 according to the present invention comprising a main case 13, a pivoted display 17, and a keyboard 15. Display 17 has a screen 19 with a photosensitive transparent over-layer (not evident in FIG. 1) connected electrically to circuit elements in computer 11, for signalling the circuitry during scanning operations. There are also optional rotatable clips 21, 23, 25, and 27, for positioning and holding a hard copy during scanning operations. Other means of holding a hard copy could also be used.

Figure 2:
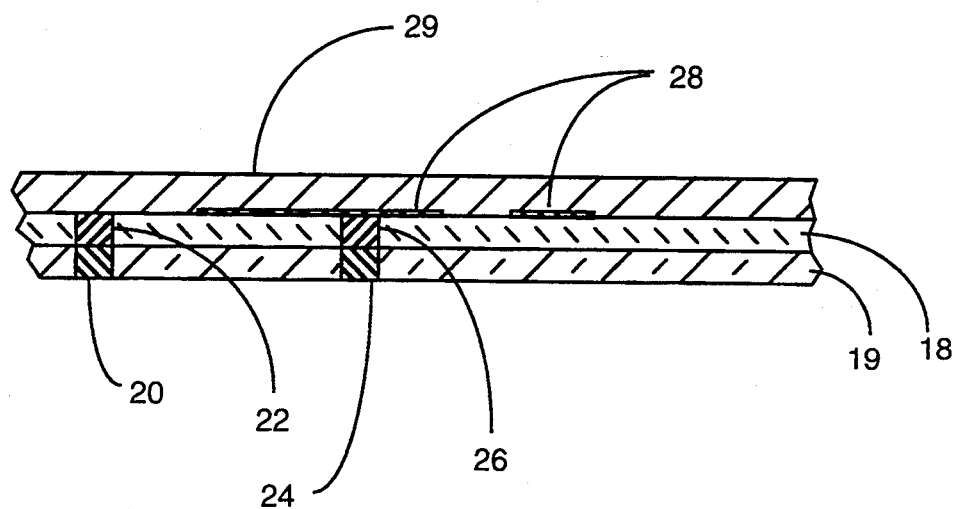
FIG. 2 is a cross-section view taken through a portion of the display screen of the computer of FIG. 1.

FIG. 2 is a partial schematic section through photosensitive transparent layer 18, screen 19, and a hard copy 29 to be scanned. In this embodiment, the screen is permanently coated with layer 18 of transparent photosensitive material and may also have a transparent overlay (not shown) for protection of layer 18. Hard copy sheet 29 with ink markings 28 is laid over photo-sensitive layer 18 to accomplish a scanning operation.

There are several films known in the art that might be used for the photosensitive layer. Preferably the film is photovoltaic. For example, the film may be a composite (multi-layer) film of amorphous silicon sandwiched between layers of n-doped and p-doped layers. A material useful for the protective overlayer is silicon dioxide.

In some instances a cover sheet may be placed over hard copy sheet 29 to shield from ambient light. Hard copy sheet 29 is typically fastened by rotatable clips 21, 23, 25, and 27 (FIG. 1) against the screen. With control elements of the present invention integrated with the computer, scanning parameters and instructions may be entered on keyboard 15.

It is not the intent or the present disclosure to describe in detail how a computer monitor display functions, but to demonstrate how a typical monitor's display characteristics can be utilized to work in concert with the invention to scan a hard copy sheet without a separate scanner or additional hardware.

An important aspect of the present invention may be illustrated with reference to FIG. 2. As is commonly known, an image on a display is formed by illuminating (or otherwise activating) small points or dots, usually called pixels (for picture elements), in an arrangement on the display screen to form the desired images. In FIG. 2, region 20 represents a first activated pixel on screen 19, emitting light toward and into photosensitive layer 18. The light is received generally in region 22 of the photosensitive layer. Region 24 represents a second activated pixel emitting the same quantity of light as pixel 20, but into region 26 of layer 18.

Region 22 is adjacent a pixel-sized area of hard copy 29 that has no ink (is "white"). Some light passing through is reflected back into layer 18, and the total light intensity generates a corresponding voltage $V_H$. In region 26 adjacent black ink on the hard copy absorbs light passing through, very little light is reflected back into layer 18, and the voltage generated by layer 18 is lower, $V_L$. The difference in voltage, red from layer 18 into discerning circuitry, is used to differentiate between "ink" or "no ink" in a scanning operation.

Figure 4:
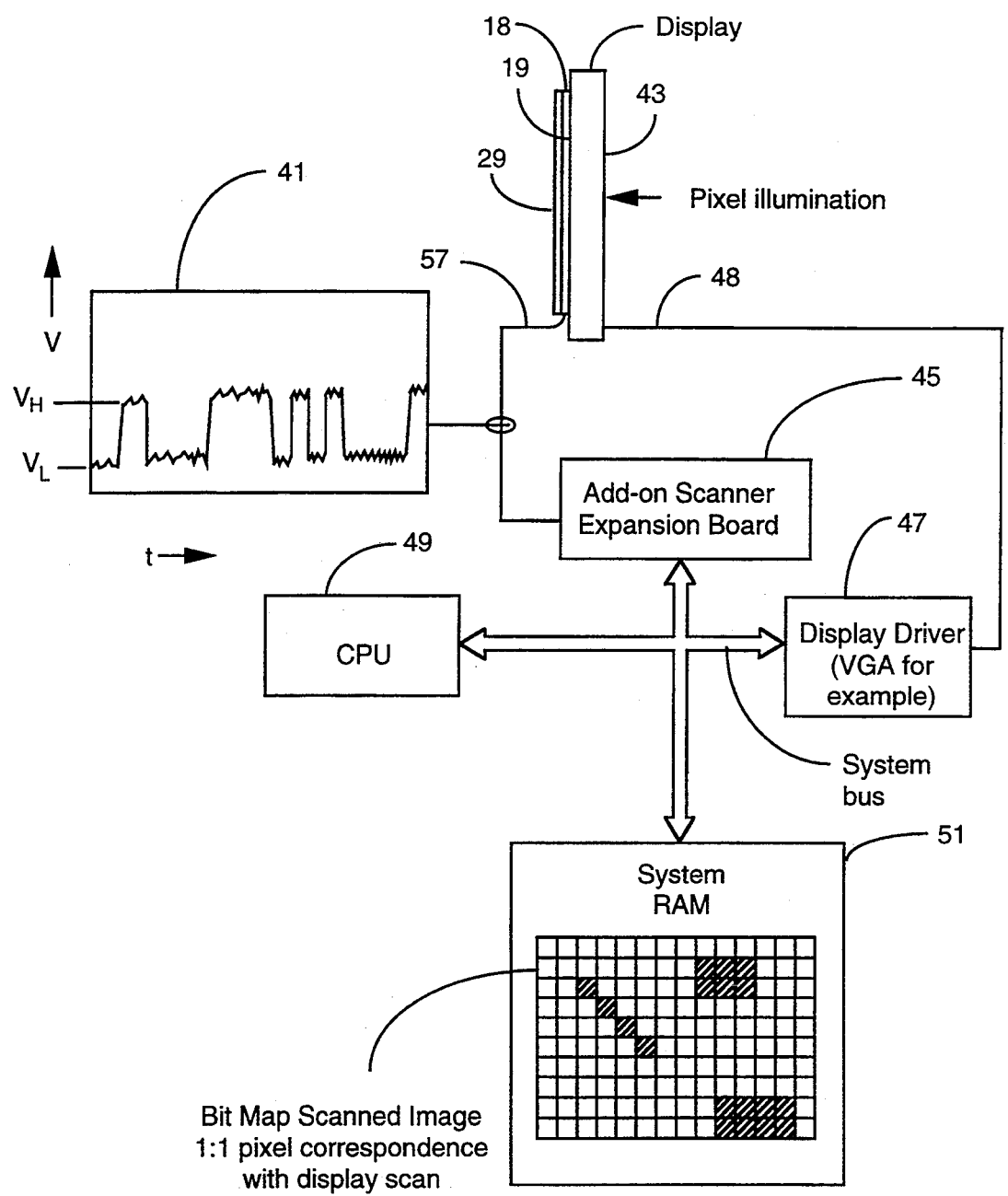
FIG. 4 is a block diagram of elements of the invention.
Figure 5:
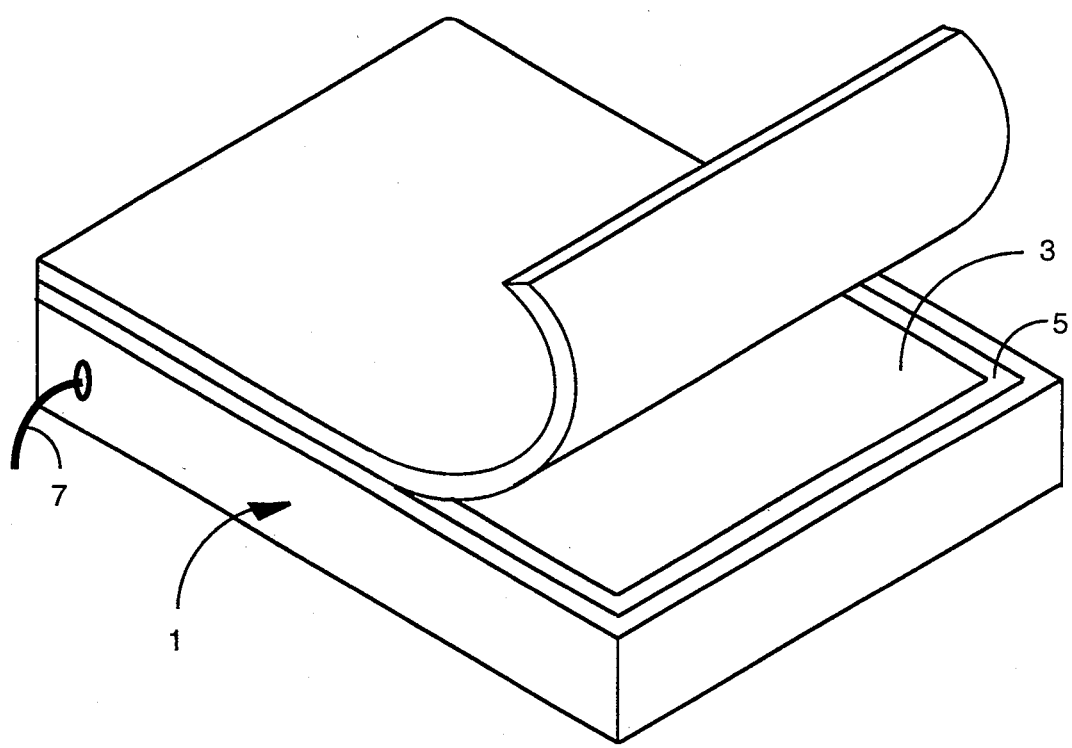
FIG. 5 is an isometric view of a prior art flat-bed scanner.
Figure 6:
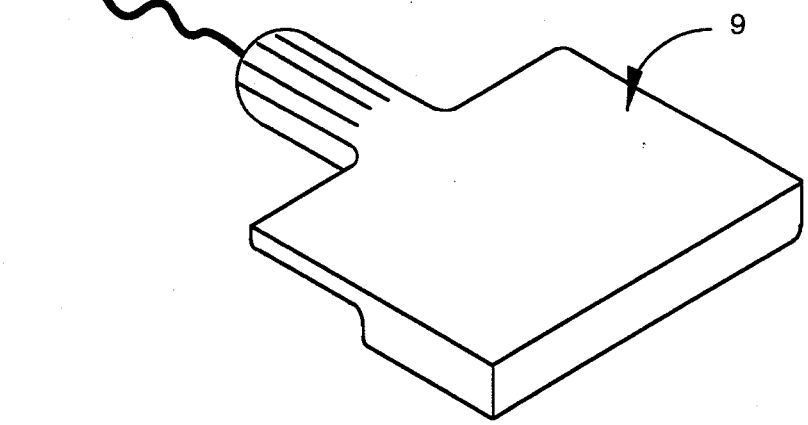
FIG. 6 is an isometric view of a prior art hand-held scanner.

FIG. 4 is a block diagram illustrating the invention in a preferred embodiment, showing elements of computer 11 (FIG. 1), comprising elements unique to the invention, and the relationships among the elements. Graph 41 is an exemplary record of voltage produced in film 18 versus time during a scanning operation. $V_L$ is the voltage level generated by layer 18 when the scan locates an ink marking; $V_H$ is the voltage level when the hard copy sheet is "white" at the point being scanned. Time is represented on the horizontal scale.

Block 47 represents a typical display driver, such as a VGA driver, which drives display 43 over signal path 48. During a scanning operation, display 43 is operated to illuminate pixels in an order to accomplish the scan, and voltage generated in photosensitive layer 18 is provided to an add-on scanner board 45 over path 57. The add-on scanner expansion board is a convenience with the present embodiment; the invention can function fully as well with the necessary interface installed, for example, on the motherboard. Expansion board 45 receives the output of photosensitive layer 18 on the display screen and provides bit-map information to CPU 49, which coordinates with display driver 47 to store a bit-map image 51 in memory. Control of the scanning operation is by control routines unique to the invention and loaded in random access memory.

The scanning order of the display is not critical to the invention, as long as individual pixels are illuminated relative to time, and all of the pixels covering the area of a hard copy to be scanned are illuminated at least once to produce the bit map image from the scan.

The resulting bit-map image can be directed to a file on scanning computer 13 and saved. If desired, additional scans can be done. Whether or not to save the image to a file can be decided at the end of a scan, while the bit-map image is still in short-term memory, allowing a user to try out different configurations.

The integral scanner of the invention works with almost any sort of display type, CRT or flat-panel. The only requirement is that the display must be an active, not passive (such as a liquid crystal diode) display. Any display that emits light in the process of scanning and updating the screen is suitable.

Every pixel in a display is illuminated once for each complete scan, and the photosensitive layer transmits electrical signals to the control system. A different voltage is initiated by a difference in the amount of light registered on the photo-sensitive layer; a pixel that is covered by an ink mark will register less light than one that is blank (has no ink mark). The screen may be scanned as many times as necessary; one approach might be to scan as many times as there are pixels (a 640×400 pixel VGA display would have 256,000 pixels) and record the voltage signal of one pixel per scan. The control system can be programmed to record pixels in another sequence equally as well and re-scanning can be done as often as necessary.

All the options available in a typical scanning program may be made available in the control system of the invention, such as dithering, bit-map editing, scaling, and so forth.

The great majority of displays, both CRT and flat-panel, are multiplexed. In a multiplexed display, only one pixel of the display is on at any instant. The control logic switches from one to the next quickly enough so that all, parts of the display appear to be lit simultaneously.

The control system that comprises the present embodiment can be programmed to record the location and voltage of only a single pixel each time the entire screen is scanned, the location and condition of a second pixel on the next complete screen scan, and so forth. Any other arrangement, such as recording a sequence of points that are not contiguous, can be programmed and used equally well. One of the advantages to a more random sampling of pixels would be elimination of errors introduced by ghosting, which occurs when a pixel is not entirely off before another pixel comes on.

Color images can be scanned and saved in memory if the display is capable of displaying color. For each pixel in a color display, there must be three spots of phosphor, corresponding to an RGB display. Each color is scanned separately and the results are merged by the control system. In a typical analog interface, a different voltage level is produced for each color; a TTL-interface (of which EGA and CGA are examples) treats each color as a digital input, turning the corresponding color on or off. In the latter, only eight colors can be displayed, corresponding to the eight possible patterns of three bits. In both types of color display, screen resolution (and thus bit-map image scan resolution) is limited by the spacing between the phosphor dots, called the dot pitch.

Gray-scale images can also be scanned and saved. To provide gray levels, more than one bit/pixel is required; 8 bits/pixel provides 256 gray levels, enough for virtually any application. A different voltage is registered by the scanning circuitry for each gray level pixel in an image.

A flat-panel display has the added advantage of a flat screen, reducing any errors possibly introduced by screen curvature. Although a CRT display can display color, and tends to be brighter, the flat-panel display is more readily used in notebook computers. Since control of multiplexed LEDs (commonly used in a flat-panel display) can be implemented entirely in software, changes to its basic operation are achievable with software as well, so that a system can be customized within the control system of the present embodiment.

Figure 3:
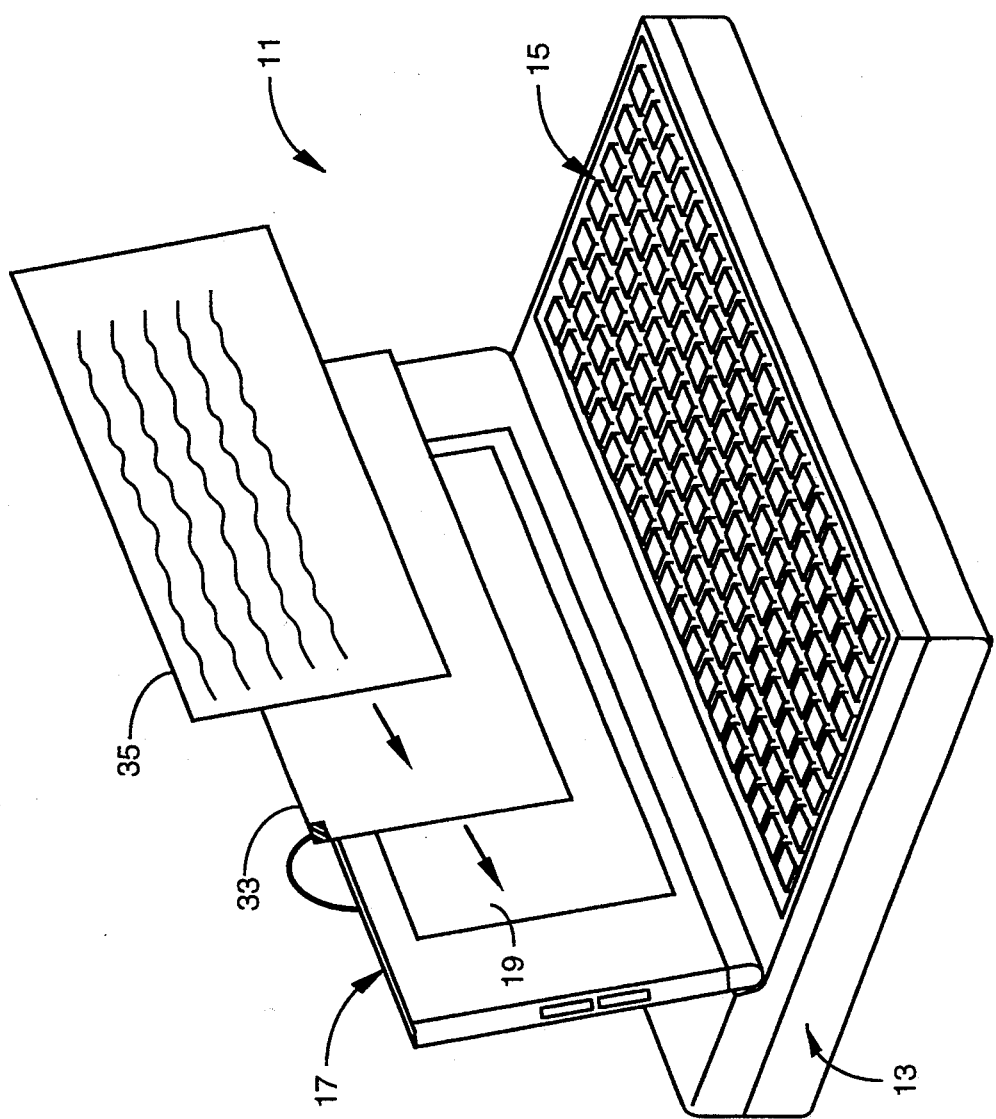
FIG. 3 is an isometric view of the notebook computer of FIG. 1 with the scanner elements implemented separately from the display screen.

An alternative embodiment of the present invention comprises the use of a separate flexible sheet of material such as mylar to which has been applied a photosensitive coating. The screen itself in this alternative embodiment does not have the photo-sensitive coating applied. FIG. 3 shows such a photo-sensitive sheet 33 for applying over screen 19. A hard copy 35 is laid over photosensitive sheet 33 to be scanned and an optional backing (not shown) may be used as well. The photo-sensitive sheet is connected by a cable 34 to control system circuitry that monitors voltages generated by a scanning pass over the hard copy. Other than the photosensitive element being separate from the display screen, the invention in this embodiment operates the same as described above for the first-described embodiment. The separate photosensitive sheet makes the invention applicable to existing computers.

It will be apparent to one with skill in the art that there are many changes that may be made to the embodiments of the invention described herein without departing from the spirit and scope of the invention. Some of these have already been listed above, such as the fact that the invention is not limited to any particular type of computer or computer display system. Further, there are alternative films that may be used for the photosensitive layer, and there is great flexibility in the order of activation of pixels to accomplish a scan, There are similarly many other changes that may be made without departing from the spirit and scope of the invention.

What is claimed is:

1. A display system for scanning hard copy documents, comprising:
    a display having a front surface and configured for illuminating pixel elements in a sequence determined by a host computer;
    a photosensitive layer overlying at least a portion of the front surface; and
    circuitry connected to the photosensitive layer for providing electrical signals generated in the photosensitive layer to the host computer.

2. A display system as in claim 1 further comprising mounting apparatus for mounting a hard copy document adjacent the display.

3. A display system as in claim 1 wherein the photosensitive layer comprises a layer of substantially transparent material integral with the front surface of the display, 4. A display system as in claim 1 wherein the photosensitive layer is a part of a separate and removable panel configured for mounting adjacent to the front surface of the display.

5. A display system as in claim 1 wherein the display comprises a cathode ray tube.

6. A display system as in claim 1 wherein the display comprises an LED display matrix.

7. A display system as in claim 1 wherein the display comprises an array of electroluminescent cells, 8. A display system as in claim 1 wherein the photosensitive layer is a photovoltaic film, and the signals generated as a result of incident light comprise variations in voltage.

9. A computer system configured for scanning hard copy documents comprising:
    a general-purpose computer; and
    a display system connected to the general-purpose computer;
    Wherein the display system comprises a display with a photosensitive layer overlying at least a portion of a front surface thereof, and signal circuitry for providing electrical signals generated in the photosensitive layer to the general-purpose computer.

10. A computer system as in claim 9 wherein the computer system comprises a laptop personal computer having a flat panel display.

11. A computer system as in claim 9 wherein the photosensitive layer comprises a layer of substantially transparent material integral with the front surface of the display.

12. A computer system as in claim 9 wherein the photosensitive layer is a part of a separate and removable panel configured for mounting adjacent the front surface of the display.

13. A computer system as in claim 9 wherein the photosensitive layer comprises a photovoltaic film.

14. A scanning system for use with a general-purpose computer having a display with a front surface, comprising:
    a sheet comprising a photosensitive layer, the sheet configured for positioning adjacent the front surface of the display for generating a signal in response to light from illuminated pixels on the display;
    electrical circuitry connected to the photosensitive layer and configured for conveying signals generated by the photosensitive layer to the general-purpose computer; and
    control circuitry for receiving and processing signals from the photosensitive layer to provide a bit mapped image of a hard copy document placed adjacent the photosensitive layer.

15. A scanning system as in claim 14 wherein the control circuitry for receiving and processing signals is configured as an expansion card compatible with expansion slots in an IBM compatible computer.

16. A scanner panel for use with general-purpose computer having a display with a front surface, comprising:
    a transparent panel for positioning adjacent the front surface;
    a transparent, photosensitive layer overlying at least a portion of the transparent panel; and electrical circuitry connected to the photosensitive layer and configured for conveying signals generated by the photosensitive layer to the general-purpose computer.

17. A scanner panel as in claim 16 wherein the panel comprises a sheet of flexible polymeric material for improving transport and storage characteristics.

* * * * *